(12) United States Patent
Bals et al.

(10) Patent No.: US 11,971,074 B2
(45) Date of Patent: Apr. 30, 2024

(54) BRAKE ARRANGEMENT FOR A DRIVE APPARATUS

(71) Applicant: Edscha Engineering GmbH, Remscheid (DE)

(72) Inventors: Jochen Bals, Dortmund (DE); Jörg Dörnen, Breckerfeld (DE)

(73) Assignee: EDSCHA ENGINEERING GMBH, Remscheid (DE)

( * ) Notice: Subject to any disclaimer, the term of this patent is extended or adjusted under 35 U.S.C. 154(b) by 805 days.

(21) Appl. No.: 17/042,895

(22) PCT Filed: Mar. 7, 2019

(86) PCT No.: PCT/DE2019/100206
§ 371 (c)(1),
(2) Date: Sep. 28, 2020

(87) PCT Pub. No.: WO2019/185081
PCT Pub. Date: Oct. 3, 2019

(65) Prior Publication Data
US 2021/0054889 A1    Feb. 25, 2021

(30) Foreign Application Priority Data
Mar. 28, 2018    (DE) .................... 20 2018 101 761.6

(51) Int. Cl.
*E05F 15/622*      (2015.01)
*F16D 55/38*       (2006.01)

(52) U.S. Cl.
CPC ............ *F16D 55/38* (2013.01); *E05F 15/622* (2015.01); *E05Y 2201/21* (2013.01);
(Continued)

(58) Field of Classification Search
CPC .... F16D 55/38; E05F 15/622; E05Y 2201/21; E05Y 2201/702; E05Y 2900/531; E05Y 2900/546
(Continued)

(56) References Cited

U.S. PATENT DOCUMENTS 4,872,239 A * 10/1989 Ferguson ................ E05F 1/105
                                                      16/64
11,067,156 B1 * 7/2021 Heiberger ........... F16H 25/2454
(Continued)

FOREIGN PATENT DOCUMENTS

CN    102264993 A    11/2011
CN    103511574 A    1/2014
(Continued)

OTHER PUBLICATIONS

Corresponding PCT International Search Report of PCT/DE2019/100206.

*Primary Examiner* — Christopher P Schwartz
(74) *Attorney, Agent, or Firm* — Davidson, Davidson & Kappel, LLC

(57) ABSTRACT

A brake arrangement for a drive apparatus includes a brake case (15), a first brake element (17), a second brake element (19), and a preload (21) for preloading one of first brake element (17) and second brake element (19) onto the other of first brake element (17) and second brake element (19). A brake arrangement for a drive apparatus, which brake arrangement exhibits a substantially temperature-dependent and consistent braking action, is realized in that an intermediate element (20) is arranged between the first brake element (17) and the second brake element (19), and the first brake element (17) and the second brake element (19) are spaced apart from one another by the intermediate element (20).

14 Claims, 3 Drawing Sheets

(52) U.S. Cl.
CPC ... *E05Y 2201/702* (2013.01); *E05Y 2900/531* (2013.01); *E05Y 2900/546* (2013.01)

(58) Field of Classification Search
USPC .................. 188/71.5; 16/64, 79, 82; 49/340
See application file for complete search history.

(56) References Cited

U.S. PATENT DOCUMENTS

| | | | |
|---|---|---|---|
| 2006/0124250 A1* | 6/2006 | Hsieh ........................ | E06B 9/82 160/9 |
| 2009/0084885 A1* | 4/2009 | Causey ................. | E01F 13/048 242/410 |
| 2011/0290050 A1 | 12/2011 | Kummer et al. | |
| 2014/0000394 A1 | 1/2014 | Anheier et al. | |
| 2016/0312514 A1 | 10/2016 | Leonard et al. | |
| 2017/0248183 A1 | 8/2017 | Strobel | |
| 2018/0371821 A1* | 12/2018 | Fees ...................... | E05F 15/622 |
| 2019/0323277 A1* | 10/2019 | Schmengler .......... | F16D 69/023 |
| 2023/0090696 A1* | 3/2023 | Dörnen .................. | F16D 7/021 |

FOREIGN PATENT DOCUMENTS

| | | | |
|---|---|---|---|
| CN | 106795929 A | 5/2017 | |
| CN | 206903460 U | 1/2018 | |
| CN | 107842275 A | 3/2018 | |
| DE | 102016207415 A1 | 10/2016 | |
| DE | 102015009717 A1 | 2/2017 | |
| JP | 2002276691 A | 9/2002 | |
| WO | WO2011003827 A1 | 1/2011 | |
| WO | WO2017081277 A1 | 5/2017 | |

\* cited by examiner

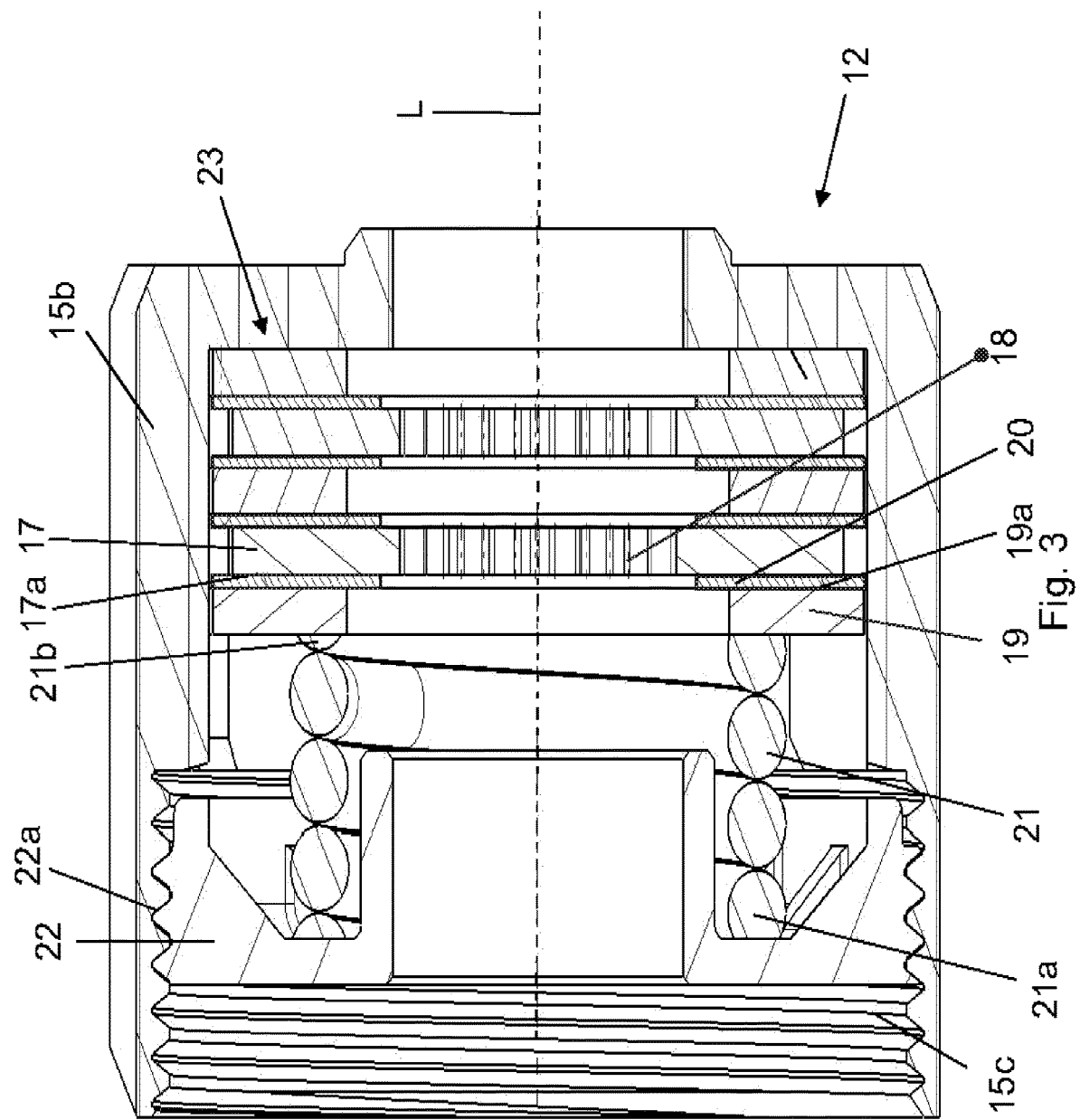

BRAKE ARRANGEMENT FOR A DRIVE APPARATUS

The present disclosure relates to a brake arrangement for a drive apparatus. The present disclosure also relates to a drive apparatus for a pivotable vehicle flap.

BACKGROUND

Drive apparatuses which are used for automatically pivoting a vehicle flap, for example a tailgate or a vehicle door, are known from practice. Such drive apparatuses are usually designed as linear drives which are adjustable in length and of which a first end is articulated on a vehicle body part and a second end is articulated on the vehicle flap to be pivoted, such that when the length of the drive apparatus changes, an opening movement or a closing movement of the vehicle flap is effected. In this case, the drive apparatus often has a brake arrangement which can allow the drive apparatus to simultaneously be used as a door stay hinge, because the brake arrangement counteracts a pivoting movement of the vehicle flap effected by external forces. The brake apparatuses can be influenced by a control apparatus in such a way that a braking force can be provided on the basis of external parameters.

Alongside an additional securing function, brake arrangements are also used in practice to ensure that, when a driven movement of the vehicle flap ends, the drive apparatus is largely prevented from overrunning as a result of inertia. For this purpose, permanently acting brake arrangements are used in the drive apparatus, for example disk brakes or multi-disk brakes, the braking force being generated by a first brake element, which is rotatable relative to a housing of the drive apparatus, and a second brake element, which is fixed relative to a housing of the drive apparatus, being in frictional contact with one another. However, this often gives rise to the problem that the braking force varies over time due to the temperature-dependent friction coefficient of the brake surfaces of the brake elements.

DE 10 2015 009 717 A 1 discloses a drive apparatus for a pivotable vehicle flap, having a housing which comprises a first housing part and a second housing part that is arranged concentrically with respect to the first housing part. A spindle rod is rotatably arranged in the housing. The disclosed drive apparatus further comprises a non-rotatable spindle nut which can be brought into engagement with thread portions provided on the spindle rod. A brake arrangement designed as a multi-disk brake is arranged in the housing. The brake arrangement comprises a housing, a first brake element which is designed as an inner disk and is non-rotatably connected to the spindle rod, a second brake element which is designed as an outer disk and is non-rotatably connected to the housing of the brake assembly, and a biasing means for biasing the first brake element in the direction towards the second brake element. The disadvantage of the disclosed drive apparatus or the brake arrangement is that, in order to avoid slip-stick or irregular friction coefficients, the mutually facing brake surfaces of the disks must have an oil film which eventually needs to be renewed. Accordingly, maintenance is rather complex, and the endurance behavior over time is both sub-optimal and temperature-dependent.

SUMMARY

An aim of the present disclosure is to specify a brake arrangement for a drive apparatus which has a largely temperature-independent and regular braking effect. Another aim of the present disclosure is to specify a drive apparatus for a pivotable vehicle flap which has improved overrun behavior.

According to one aspect of the present disclosure, a brake arrangement for a drive apparatus is provided which comprises a brake housing, a first brake element, a second brake element and a biasing means for biasing one of the first brake element and the second brake element towards the other of the first brake element and the second brake element. The brake arrangement is characterized in that an intermediate element is arranged between the first brake element and the second brake element, the first brake element and the second brake element being spaced apart from one another by the intermediate element. The intermediate element advantageously makes it possible to achieve improved behavior of the brake arrangement with regard to maintaining a constant friction coefficient over the long term. The intermediate element can also be easily replaced if necessary; the brake elements themselves do not have to be replaced unless there is a change in the friction coefficients in the brake arrangement. Finally, the intermediate element makes it possible to select more cost-effective materials for the brake elements, and the production costs for the brake arrangement overall can therefore be reduced.

The intermediate element particularly preferably consists at least in part of a carbon-fibre fabric. Carbon is characterized in particular by high compressive strength and hardness, the strength not decreasing with increasing temperature and thus having largely temperature-independent durability. Carbon is also known for its very good sliding properties, so there are few signs of wear during continuous operation and, at the same time, due to the excellent sliding properties, there is no slip-stick, or carbon has a constant friction coefficient over a wider temperature range. The cloth can have known weaves such as linen weave, twill weave and satin weave.

In an advantageous embodiment, the first brake element is designed to be annular. The first brake element can advantageously be slid easily onto a part of the drive apparatus to be braked and non-rotatably connected such that particularly simple replacement is possible. The first brake element is particularly preferably designed as an annular inner disk having at least one first brake surface.

The second brake element is expediently designed to be annular. The second brake element is particularly preferably designed as an annular outer disk having at least one second brake surface. The respective brake surfaces of the first brake element and the second brake element can therefore advantageously be brought into contact with the intermediate element such that the friction that generates the braking effect arises between the brake surfaces of the brake elements and the intermediate element, and improved braking properties can therefore be achieved.

The annular first brake element particularly preferably has an inner toothing on an inner circumference. Advantageously, the first brake element can easily be slid onto a component of the drive apparatus that has a corresponding outer toothing, the brake element being arranged on the component so as to be both axially displaceable and non-rotatable at the same time. This advantageously ensures that the braking force can be adjusted by the biasing means and that the brake element can be easily replaced.

In an expedient embodiment, the brake arrangement comprises a stop member, a first end of the biasing means resting against the stop member and a second end of the biasing means resting against one of the first brake element and the second brake element. In this way, the excellent regular braking effect the biasing required is advantageously provided by the stop member, the bias also being determined by the arrangement of the stop member relative to the brake elements.

In a preferred embodiment, the stop member is designed to be annular. The stop member can thus be advantageously designed to save material, the stop member or the ring surface being dimensioned both such that a stop surface is provided for the biasing means and such that it is possible to provide guide surfaces for the biasing means.

The stop member particularly preferably has an outer thread on an outer circumference. This advantageously creates the possibility of simply inserting the stop member by screwing it in or removing it again by unscrewing it, so that the stop member can be easily replaced and, moreover, easy access to the biasing means or the brake elements and the intermediate element is made possible. The brake housing expediently has at least in portions an inner thread, wherein the outer thread of the stop member engages with the inner thread of the brake housing. The bias of the biasing means can thus be advantageously regulated by screwing in or unscrewing the stop part relative to the brake housing.

The biasing means is expediently designed as a compression spring. A reliable and cost-effective possibility for selecting the braking force by selecting the compression spring is advantageously provided in this way. The compression spring can also be easily replaced.

According to another aspect of the present disclosure, a drive apparatus for a pivotable vehicle flap, comprising a housing and a spindle rod which is rotatably arranged in the housing, is provided. The drive apparatus further comprises a brake arrangement having a brake housing, a first brake element which can be non-rotatably connected to the spindle rod, and a second brake element which is non-rotatably connected to the brake housing, wherein at least one of the first brake element and the second brake element is displaceable along a longitudinal axis of the spindle rod. The brake arrangement further comprises a biasing means for biasing the brake element that is displaceable along the longitudinal axis of the spindle rod towards the other brake element. In this case, the drive apparatus is characterized in that the brake arrangement is designed as described above. This advantageously provides a drive apparatus which, due to the largely temperature-independent and reliable braking behavior of the brake arrangement, has improved overrun behavior, so that, in particular when a driven pivoting process of a driven vehicle flap ends, there is reliable and regular stopping.

In a preferred embodiment, the intermediate element is displaceable along the longitudinal axis of the spindle rod. This advantageously ensures that the intermediate element can be displaced together with the displaceable brake element in the direction towards the other brake element, a braking effect therefore arising as a result of the frictional contact between the intermediate element and the brake element. Expansions caused by heating are also advantageously compensated for, so that a constant friction coefficient is maintained between the intermediate element and the brake element.

In an expedient embodiment, the first brake element can be interlockingly connected to the spindle rod. In a preferred embodiment, the spindle rod has outer toothing in a brake portion. In this way, the first brake element can advantageously be non-rotatably connected to the spindle rod in the brake portion by means of interlocking contact, with the first catch element, however, remaining displaceable in the axial direction of the spindle rod.

The brake arrangement is expediently designed as a multi-disk brake. In this case, the multi-disk brake has outer disks which are oriented radially towards the spindle rod longitudinal axis and which are fixedly arranged along an inner circumference of a hollow-cylindrical multi-disk brake housing at a fixed axial distance from one another. The outer disks thus concentrically surround a defined brake portion of the spindle rod, but without touching the spindle rod. The braking of the rotation of the spindle rod about its longitudinal axis is now achieved by the spindle rod in turn having radially circumferential and axially spaced inner disks along its outer circumference, which disks are arranged in the brake portion of the spindle rod such that they penetrate the space between the outer disks without touching the inner circumference of the hollow cylindrical multi-disk brake housing. The inner and outer disks which engage in one another are then pressed against one other by the biasing means, such that friction, conveyed by the intermediate element, arises between the disks, which friction in particular brakes a rotation of the spindle rod about its longitudinal axis.

Further advantages, developments and characteristics of the present disclosure can be found in the following description of a preferred embodiment.

BRIEF DESCRIPTION OF THE DRAWINGS

The present disclosure will now be explained in more detail with reference to the accompanying drawings and a preferred embodiment of the present disclosure.

FIG. 3 is a detail of the brake arrangement shown in FIG. 1 and FIG. 2 in the removed state.

DETAILED DESCRIPTION

Figure 1:
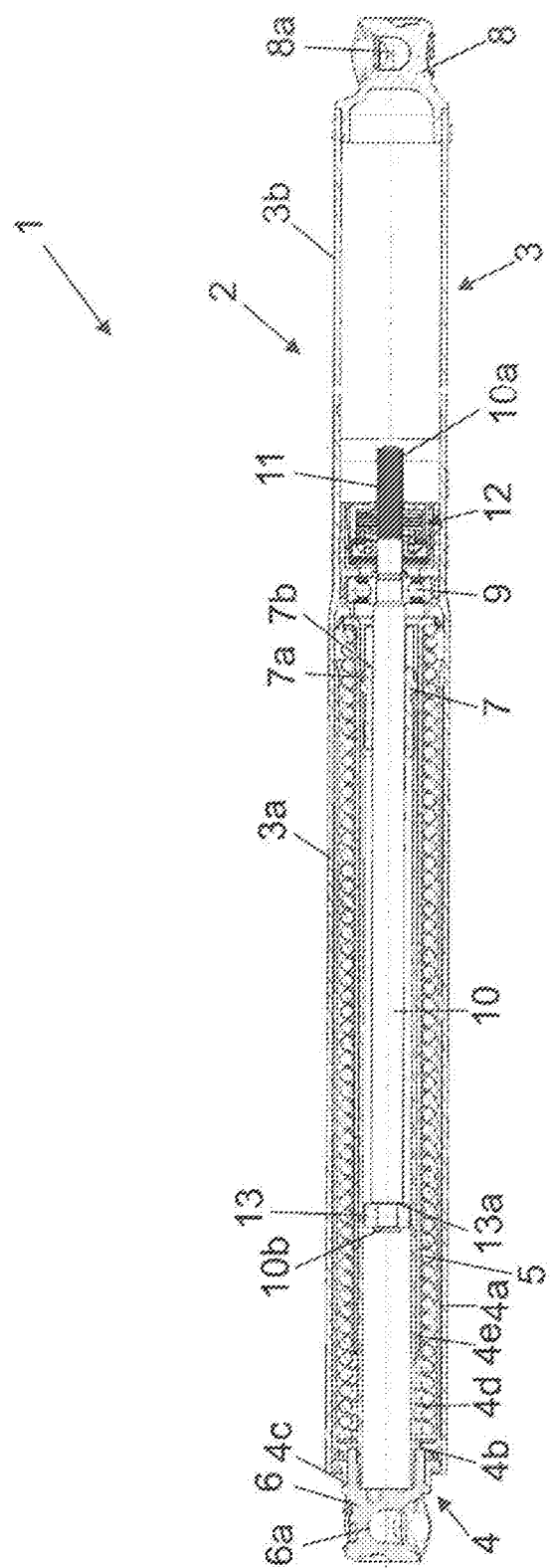
FIG. 1 is a longitudinal section of an embodiment of a drive apparatus.

FIG. 1 is a longitudinal section of a drive apparatus 1 in the completely retracted state. The closed housing 2 of the drive apparatus 1 comprises a first housing part 3 and a second housing part 4. The first housing part 3 and the second housing part 4 in the embodiment are designed as open hollow cylinders, which are slid concentrically over one another such that the closed housing 2 of the drive apparatus 1 can be telescopically retracted and extended. The first housing part 3 has a larger inner and outer diameter in a first portion 3a than in an adjoining second portion 3b. The first portion 3a extends in the axial direction to such an extent that the second housing part 4 can be slid almost completely into the first portion 3a of the first housing part 3.

An outer wall 4a of the second housing part 4, which wall is designed as a hollow cylinder, is delimited, at an end of the second housing part 4 that faces away from the second portion 3b of the first housing part 3, by an annular base 4b which is inwardly radially circumferential at a right angle and serves as a first stop surface for a helical spring 5. On the side facing away from the helical spring 5, the annular base 4b has a hollow cylinder projection 4c into which a first joint part 6 is interlockingly press-fitted, which part has a self-locking plastics ball socket 6a in its interior. The first joint part 6 thus defines a first closed end of the housing 2, on which, for example, one of the vehicle flap and the vehicle body part can be articulated.

An additional hollow cylinder 4d, which is arranged concentrically within the second hollow-cylindrical housing part 4, is press-fitted in the end of the first joint part 6 that faces the annular base 4b. The outer diameter of the hollow cylinder 4d corresponds to the inner diameter of the annular base 4b. The helical spring 5 is arranged or designed such that it extends over the first portion 3a of the first housing part 3 in the axial direction and is located radially between the outer wall 4a and the hollow cylinder 4d. In an end portion of the hollow cylinder 4d that faces away from the first joint part 6, a cylindrical spindle nut 7 is press-fitted along the inner circumference of the hollow cylinder 4d. The spindle nut 7 has a chamfer 7b on an end face 7a.

The second portion 3b of the first housing part 3 has, at the end thereof which faces away from the first joint part 6, a press-fitted second joint part 8 comprising a self-locking ball socket Ba. The second joint part 8 thus defines a second closed end of the housing 2, on which, as in the case of the first joint part 6, the other of the tailgate and the vehicle body part can be articulated.

An annular ball bearing 9, in which a spindle rod 10 is mounted so as to be rotatable about its longitudinal axis L, is press-fitted in the end portion of the second portion 3b of the first housing part 3, which end portion adjoins the first portion 3a. The spindle rod 10 extends axially over such a large region within the housing 2 that the spindle rod 10 completely penetrates the ball bearing 9 and the spindle nut 7 and concentrically penetrates part of the first housing part 3. The spindle rod 10 has an axially extending groove profile 11 in a first end portion 10a that faces the second joint part 8. The end portion 10a is at least in portions radially enclosed by a brake arrangement 12 designed as a multi-disk brake, which is shown in more detail in FIGS. 2 and 3. In addition, a stop member 13, which forms an annular stop surface 13a via an end face that faces the spindle nut 7, is fixedly arranged at an end 10b of the spindle rod 10 that is opposite the first end portion 10a. The outer diameter of the stop member 13 corresponds to the inner diameter of the hollow cylinder 4d and is arranged concentrically with respect to the first housing part 3 and the second housing part 4.

Figure 2:
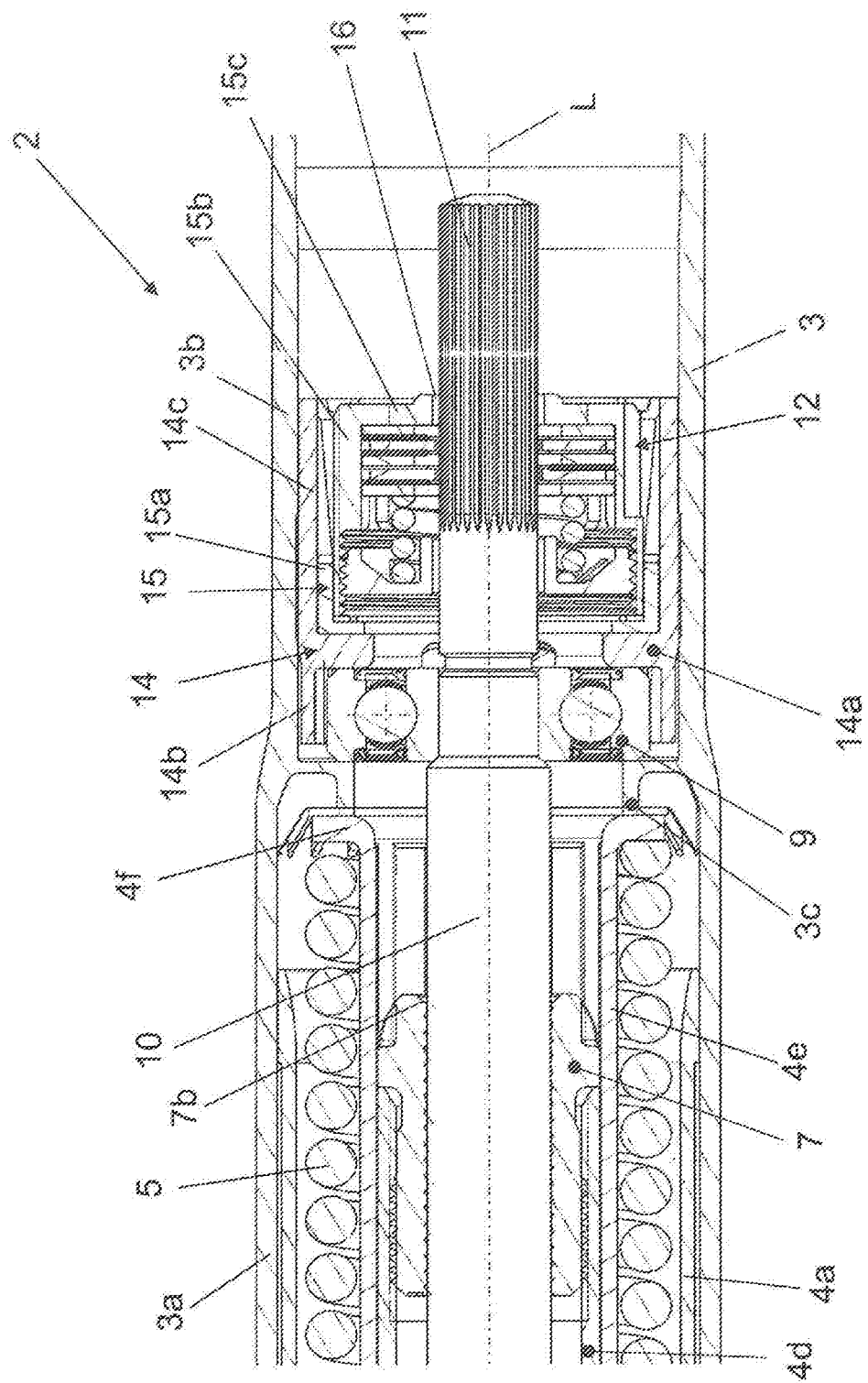
FIG. 2 is an enlarged detail of the embodiment of a drive apparatus shown in FIG. 1.

FIG. 2 is an enlarged detail of the embodiment of a drive apparatus shown in FIG. 1, which in particular shows the structure of the brake arrangement 12 designed as a multi-disk brake in more detail.

A hollow cylinder 14 is press-fitted in the end portion of the second portion 3b of the first housing part 3, which end portion adjoins the first portion 3a, which hollow cylinder has, along its inner circumference, an annular base 14a that divides the inner wall of the hollow cylinder 14 into a portion 14b that faces away from the second joint part 8 and a portion 14c that faces the second joint part 8. The annular ball bearing 9 is press-fitted along the inner diameter of the portion 14b. The ball bearing 9, on the side thereof that faces the first joint part 6, is connected via a bridge 3c to a hollow cylinder 4e of the second housing part 4, which hollow cylinder protrudes concentrically into the first housing part 3 in the space enclosed by the first portion 3a of the first housing part 3. The hollow cylinder 4e radially surrounds the hollow cylinder 4d, the helical spring 5 in turn radially surrounding the hollow cylinder 4e.

At the end closest to the ball bearing 9, the hollow cylinder 4e has, along its outer circumference, a radially circumferential collar 4f which forms a second stop surface for the helical spring 5.

A brake housing 15 of the multi-disk brake 12 is press-fitted into the portion 14c of the hollow cylinder 14 and comprises a first crucible-shaped brake housing part 15a and a second crucible-shaped brake housing part 15b. The open end of the first brake housing part 15a points in the direction of the first joint part 6, and the open end of the second brake housing part 15b that faces away from the second joint part 8 is in turn press-fitted into the first brake housing part 15a such that the space which is radially surrounded by the portion 14c of the hollow cylinder 14 is enclosed. The second crucible-shaped brake housing part 15b has a concentric bore 16 in its bottom surface 15c which is penetrated by the spindle rod 10.

FIG. 3 shows a detail of the brake arrangement 12 designed as a multi-disk brake shown in FIG. 2 in the removed state.

The brake arrangement 12 comprises a first annular brake element 17, which is designed as an inner disk having a first brake surface 17a and has an inner toothing 18 on its inner diameter, which toothing engages with the groove profile 11 of the spindle rod 10 in the installed state. As a result, the first brake element 17 is axially displaceable along the longitudinal axis L of the spindle rod 10 and at the same time can be non-rotatably connected to the spindle rod 10. A second annular brake element 19 having a second brake surface 19a is arranged on an inner diameter of the second brake housing part 15b of the brake housing 15 so as to be floating but non-rotatable. Between the first brake element 17 and the second brake element 19, there is an annular intermediate element 20, which is designed as a disk made of woven carbon.

The brake arrangement 12 further comprises a biasing means 21 designed as a compression spring, a first end 21a of which rests against a stop member 22 screwed into the second brake housing part 15b, which stop member is annular and has an outer thread 22a that engages with an inner thread 15c provided on an inner diameter of the second brake housing part 15b of the brake housing 15. A second end 21b of the biasing means 21 rests against the second brake element 19. In this way, the biasing means 21 biases the second brake element 19 towards the first brake element 17 and thus ensures that the intermediate element 20 is clamped between the first brake element 17 and the second brake element 19, and a braking effect on the rotational movement of the spindle rod 10 can thereby be realized by means of the friction. In the embodiment shown here, the brake arrangement comprises two first brake elements 17, three second brake elements 19 and four intermediate elements 20, which together form a disk set 23.

On its inner circumference, the annular stop member 22 has a projecting hollow cylinder portion 22b, that guides the biasing means 21, which is designed as a compression spring and which radially surrounds the hollow cylinder portion 22b.

The present disclosure has been explained above with reference to an embodiment in which the biasing means rests against the second brake element and biases said brake element in the direction towards the first brake element. It should be understood that the biasing means can also rest against the first brake element and bias said element in the direction towards the second brake element. In general, the number of sequences of brake elements and intermediate elements present in the disk set can be selected freely, provided that at least one intermediate element is arranged between the brake elements.

What is claimed is:

1. A drive apparatus for a pivotable vehicle flap, comprising
   a housing;
   a spindle rod which is rotatably arranged in the housing; and
   a brake arrangement, comprising:
      a brake housing;
      a first brake element which can be non-rotatably connected to the spindle rod, wherein the first brake element is designed as an annular brake disk having at least one first brake surface;
      a second brake element which is non-rotatably connected to the brake housing, wherein the second brake element is designed as an annular brake disk having at least one second brake surface, wherein at least one of the first brake element and the second brake element is displaceable along a longitudinal axis of the spindle rod;
      an intermediate element arranged between the first brake element and the second brake element, wherein the first brake element and the second brake element are spaced apart from one another by the intermediate element and wherein the intermediate element is designed as a disk made of carbon-fibre fabric; and
      a biasing member for biasing the brake element which is displaceable along the longitudinal axis of the spindle rod in the direction towards the other brake element,
      wherein the intermediate element is arranged between the first brake surface of the first brake element and the second brake surface of the second brake element and is in contact with each of the first brake surface of the first brake element and the second brake surface of the second brake element.

2. The drive apparatus according to claim 1, wherein the brake arrangement comprises a stop member, wherein a first end of the biasing member rests against the stop member and a second end of the biasing member rests against one of the first brake element and the second brake element.

3. The drive apparatus according to claim 2, wherein the stop member has an outer thread on an outer circumference.

4. The drive apparatus according to claim 3, wherein the brake housing has at least in portions an inner thread, wherein the outer thread of the stop member engages with the inner thread of the housing.

5. The drive apparatus according to claim 2, wherein the stop member is designed to be annular.

6. The drive apparatus according to claim 1, wherein the first brake element can be interlockingly connected to the spindle rod.

7. The drive apparatus according to claim 6, wherein the spindle rod has a groove profile in an end portion.

8. The drive apparatus according to claim 1, wherein the first brake element has an inner toothing on an inner circumference.

9. The drive apparatus according to claim 8, wherein the inner toothing engages with a groove profile of the spindle rod.

10. The drive apparatus according to claim 1, wherein the intermediate element is displaceable along the longitudinal axis of the spindle rod.

11. The drive apparatus according to claim 1, wherein the intermediate element is rotatable about the longitudinal axis of the spindle rod.

12. The drive apparatus according to claim 1, wherein the biasing member is designed as a compression spring.

13. A brake arrangement for a drive apparatus, comprising
    a brake housing;
    a first brake element;
    a second brake element; and
    a biasing member for biasing one of the first brake element and the second brake element towards the other of the first brake element and the second brake element,
    wherein an intermediate element is arranged between the first brake element and the second brake element,
    wherein the first brake element and the second brake element are spaced apart from one another by the intermediate element,
    wherein the brake arrangement comprises a stop member,
    wherein a first end of the biasing member rests against the stop member and a second end of the biasing member rests against one of the first brake element and the second brake element, wherein the stop member is designed to be annular,
    wherein the stop member has an outer thread on an outer circumference,
    wherein the brake housing has at least in portions an inner thread,
    wherein the outer thread of the stop member engages with the inner thread of the housing.

14. The brake arrangement according to claim 13, wherein the biasing member is configured as a compression spring.

* * * * *